United States Patent [19]

Heuer et al.

[11] 4,296,077

[45] Oct. 20, 1981

[54] RECOVERY OF MOLYBDENUM VALUES FROM LEACH MUDS

[75] Inventors: Steven R. Heuer, Arvada; Zdenka Zbranek, Littleton, both of Colo.

[73] Assignee: Engelhard Min. & Chem. Corp., Iselin, N.J.

[21] Appl. No.: 205,843

[22] Filed: Nov. 10, 1980

[51] Int. Cl.$^3$ ............................................. C01G 39/00
[52] U.S. Cl. ...................................... 423/53; 423/61; 75/103; 75/121
[58] Field of Search ...................... 423/53, 61; 75/121, 75/103

[56] References Cited

U.S. PATENT DOCUMENTS

| | | | |
|---|---|---|---|
| 3,196,004 | 7/1965 | Kunda | 423/56 |
| 3,848,049 | 11/1974 | Ronzio et al. | 423/61 |
| 3,957,946 | 5/1976 | Ronzio et al. | 423/61 |

Primary Examiner—Herbert T. Carter

[57] ABSTRACT

A process for the recovery of molybdenum values from leach muds of molybdenite concentrates which have been roasted in air to convert molybdenum sulfide to molybdenum trioxide and subsequently leached with an aqueous alkaline solution for the recovery of soluble molybdenum salts. Leach mud is treated by the process of this invention by repulping the leach mud with aqueous ammonium hydroxide under pressure, at a temperature in the range of about 50 to 150° C. for a period of 2 or more hours after which undissolved solid material is separated from the ammoniacal leach solution and repulped with an aqueous caustic leach solution at a temperature in the range of 50° to 150° C. for a period of 2 to 4 hours. Undissolved solid material is separated from the caustic leach solution and both the ammoniacal and the caustic leach solutions processed for the recovery of molybdenum salts therefrom.

4 Claims, No Drawings

RECOVERY OF MOLYBDENUM VALUES FROM LEACH MUDS

This invention is directed to a process for the recovery of molybdenum values from leach muds or residues from commercial leaching operations. Removal of additional amounts of molybdenum from the solid residue remaining when molybdenite concentrates have been roasted to the technical oxide ($MoO_3$) and subjected to leaching with an aqueous alkaline leach solution is accomplished by the process of this invention. In accordance with this invention, recovery of soluble molybdenum salts from the technical oxide leach muds is accomplished by repulping the leach mud with aqueuous ammonium hydroxide, also referred to as an ammoniacal leach solution, and then repulping the resulting residue with an aqueous solution of an alkali metal hydroxide or carbonate, also referred to as a caustic leach solution. The resulting leach solutions are then processed for the recovery of the molybdenum values.

It is already known that molybdenum values can be separated from molybdenite concentrates by converting the molybdenum sulfide to molybdenum trioxide ($MoO_3$) and extracting the molybdenum trioxide from inert solid materials by leaching the oxidized ore concentrate with an aqueous solution of ammonia or an alkali (aqueous alkaline leach solutions). The preferred alkali metal hydroxides are aqueous solutions of sodium hydroxide or potassium hydroxide.

The recovery of molybdenum from molybdenite by converting the molybdenum sulfide to molybdenum trioxide and leaching the molybdenum trioxide with a dilute aqueous ammonia solution, such as an aqueous ammonium carbonate or ammonium hydroxide solution, is disclosed, for example, in U.S. Pat. No. 3,196,004 of July 20, 1965. In the process of this patent, the molybdenite is converted to molybdenum trioxide by any of the conventional methods and the molybdenum trioxide is then leached in ammoniacal ammonium sulfate solution at ambient temperature.

The effectiveness of the methods of recovery which utilize alkaline leach solutions, such as solutions of ammonium hydroxide, sodium hydroxide, sodium carbonate, or potassium hydroxide, depend to a considerable extent upon the extent to which the molybdenum sulfide has been converted to molybdenum trioxide ($MoO_3$) by an oxidation procedure. One conventional procedure involves roasting molybdenite concentrates at about 550° C. (1000° F.) in the presence of air to drive off substantially all of the sulfur as sulfur dioxide and convert the molybdenum to molybdenum trioxide, commonly known as technical oxide. It has been found that the roasting of molybdenum sulfide is often inefficient leaving residual alkaline-insoluble molybdenum dioxide ($MoO_2$) in the technical oxide. After leaching with a dilute aqueous ammonia solution, such as an aqueous ammonium carbonate or ammonium hydroxide solution, some of the molybdenum remains in the leach muds.

In accordance with the present invention, ammonia leach muds are treated for the recovery of additional molybdenum values by repulping the leach mud first with an aqueous solution of ammonium hydroxide at elevated temperatures and oxygen pressure, and after separation of the leach liquor from the insoluble residue, repulping the residue and further leaching it with an aqueous solution of an alkali metal hydroxide, especially sodium hydroxide or potassium hydroxide. Substantial additional quantities of molybdenum are recovered from ammonia leach muds by this procedure, so that the overall molybdenum recovery of the commercial process may be increased to about 98% of the molybdenum contained in the initial concentrate.

In general, the ammonia repulp leaching operation is effectively carried out as a batch-type operation wherein the concentration of ammonia ($NH_3$) supplied to the leach tank amounts to an equivalent to about two pounds of ammonia ($NH_3$) per pound of molybdenum contained in the leach mud. If less ammonia is used, there is a decrease in the quantity of molybdenum recovered; but greater amounts of ammonia appear uneconomical. The ammonia repulp leaching operation is carried out at high pressure in the presence of oxygen (air as an oxygen source being acceptable) and a temperature in the range of about 50° to about 150° C. for a period of time sufficient to dissolve the molybdenum, usually at least about two hours and typically ranging from about two to about four hours. Both pressure and oxygen, together with the elevated temperature and time, effect or influence the reaction thereby enhancing the recovery of the molybdenum. Similarly, the leaching of the residue with an alkali metal hydroxide is effectively carried out in a batch-type operation wherein the quantity of alkali metal hydroxide, e.g., sodium hydroxide, employed is about two pounds per pound of molybdenum contained in the residue. The alkali metal hydroxide leaching operation is typically carried out at atmospheric pressure, but may be carried out under pressure to attack to a greater extent the silicious and iron matrices, and a temperature in the range of about 50° to about 150° C. for a period of time in the range of from about 2 to about 4 hours or more.

The repulping of commercial leach muds with aqueous ammonium hydroxide is preferably carried out in a pressure vessel equipped with a stirrer under pressure with air having a partial pressure of oxygen in the range of about 50 to about 200 psig. Good results are obtained using air as the source of oxygen with an air overpressure of about 300 to 500 psig, i.e., an oxygen partial pressure of about 60 to 100 psig. Oxygen of relatively high purity, e.g., commercially pure oxygen containing 98 mole percent oxygen or higher, may be used in the process and has an advantage in that the process may be carried out at relatively low total pressures, e.g., 20 to 50 psig. When air is used, a periodic or continuous purge is required to prevent nitrogen build-up in the pressure vessel as oxygen is consumed in the process and higher total pressures are required, e.g. 50 psig as the lower limit as compared with 20 psig for pure oxygen.

The process of this invention and its advantages will be apparent on the following specific examples illustrating preferred embodiments of the process. Samples of several commercial leach muds were tested to determine the amount of additional molybdenum which could be recovered from them by the application of various recovery procedures in accordance with the present invention.

EXAMPLE 1

An ammonia leach mud containing 18.91% molybdenum by weight, dry basis, was repulped with aqueous ammonium hydroxide having a concentration of two pounds of ammonia per pound of molybdenum in a stirred vessel for 2 hours at 50° C. at atmospheric pressure. The residue from the ammonia leach step was then repulped with an aqueous solution of sodium hydroxide containing two pounds sodium hydroxide per pound of molybdenum for a period of 2 hours at 50° C. The final residue contained 2.73 weight percent molybdenum, dry basis. 58% of the additional molybdenum recovery was effected by the ammonia leach repulping operation and 32%, by the caustic repulping operation for a total recovery of 90% by weight of the molybdenum in the leach mud.

EXAMPLE 2

The ammonia leach mud of Example 1 was repulped with the ammonia leach solution of Example 1 at 150° C. under autogenous pressure for a period of 2 hours, followed by the caustic repulp operation of Example 1. The final residue contained 2.70 percent molybdenum, dry basis. 90% of the molybdenum in the ammonia leach mud was recovered, 59% of the recovery taking place in the ammonia repulping leach operation and 31% in the caustic repulping leach operation.

EXAMPLE 3

The ammonia leach mud of Example 1 was repulped with ammonium hydroxide solution at 150° C. with an overpressure of air of 300 psig (an oxygen partial pressure of 60 psig) for a period of 2 hours followed by the caustic repulp operation of Example 1. The final residue contained 2.08% molybdenum, dry basis. 92% of the molybdenum in the leach mud was recovered with 67% of the recovery taking place in the ammonia repulping operation and 25% occurring in the caustic repulping operation.

EXAMPLE 4

An ammonia leach mud containing 21.5% molybdenum by weight, dry basis, was treated for the recovery of molybdenum by the procedure of Example 3. The final residue contained 2.14% molybdenum, dry basis, with recovery of 93% of the molybdenum in the leach mud, 77% taking place in the ammonia repulping operation and 16% occurring in the caustic repulping operation.

EXAMPLE 5

An ammonia leach mud containing 25.4% molybdenum, dry basis, was subjected to the procedure of Example 3. The final residue contained 2.18 weight percent molybdenum, dry basis. 94% of the molybdenum was recovered from the leach mud, 79% occurring in the ammonia repulping operation and 15% occurring in the caustic repulping operation.

A comparison of the results of the above examples shows the importance of additional oxidation with an oxygen-containing gas under pressure of the ammonia leach mud to convert residual molybdenum dioxide ($MoO_2$) to molybdenum trioxide ($MoO_3$). Examples 3, 4 and 5, wherein the leach mud is exposed to additional oxygen under pressure, show increased recoveries of approximately 10% over Examples 1 and 2 where no additional oxidation was used in either and no pressure was used in Example 1. The caustic repulping operation following the ammonia repulping step.

It will be evident from the results of the tests reported in the examples that leach muds from conventional commercial processes can yield substantial amounts of molybdenum when treated by the process of this invention.

What is claimed is:

1. In a process for the recovery of molybdenum values from molybdenite concentrates wherein the molybdenite concentrate is roasted in the presence of air to convert molybdenum sulfide to molybdenum trioxide and the resulting concentrate containing molybdenum trioxide leached with an aqueous alkaline solution whereby soluble molybdenum salts are extracted therefrom and dissolved in the leach solution and the insoluble solid leach mud separated from the leach solution, the improvement which comprises repulping the leach mud with an aqueous ammonia solution under pressure with an oxygen-containing gas, at a temperature in the range of about 50° to 150° C. for at least about 2 hours, separating residual undissolved solids from said aqueous ammonia solution, repulping said undissolved solids with an aqueous caustic leach solution at a temperature in the range of about 50° to 150° C. for at least about 2 hours, separating solid residue from said caustic leach solution, and recovering said leach solutions containing dissolved molybdenum salts.

2. A process according to claim 1 wherein said aqueous ammonia solution contains about two pounds of ammonia as $NH_3$ for each pound of molybdenum contained in said leach mud and said aqueous caustic leach solution contains about two pounds of sodium hydroxide for each pound of molybdenum contained in said undissolved solids.

3. A process according to claim 1 wherein said ammonia repulping step is conducted under pressure with an oxygen partial pressure in the range of about 20 to 200 psig.

4. In a process for the recovery of molybdenum values from molybdenite concentrates wherein the molybdenite concentrate is roasted in the presence of air to convert molybdenum sulfide to molybdenum trioxide and the resulting concentrate containing molybdenum trioxide leached with an aqueous alkaline leach solution whereby soluble molybdenum salts are extracted therefrom and dissolved in the leach solution and the insoluble leach mud separated from the leach solution, the improvement which comprises repulping the leach mud with an aqueous ammonia leach solution in the presence of oxygen under an oxygen partial pressure within the range of about 20 to 200 psig at a temperature in the range of about 50° to 150° C. for a period of time in the range of about 2 to 4 hours, separating residual undissolved solids from said aqueous ammonia leach solution, repulping said undissolved solids in an aqueous caustic leach solution at a temperature in the range of about 50° to 150° C. for a period of time in the range of about 2 to 4 hours, separating solid residue from said caustic leach solution, and recovering said leach solutions containing dissolved molybdenum salts.

* * * * *